May 27, 1941.     G. W. MILLER     2,243,641
HEDGE TRIMMER
Filed March 13, 1940     2 Sheets-Sheet 1
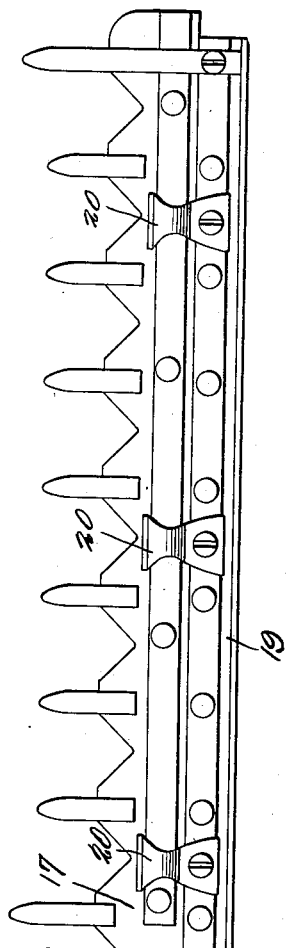
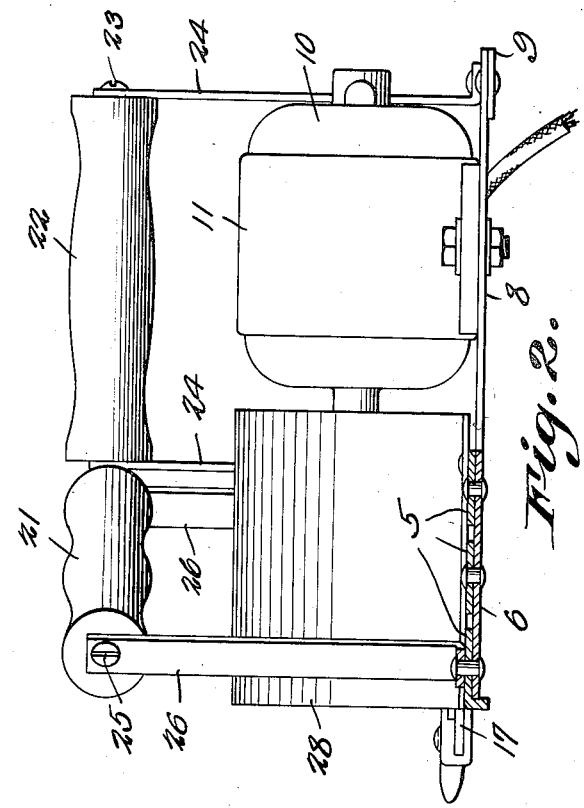
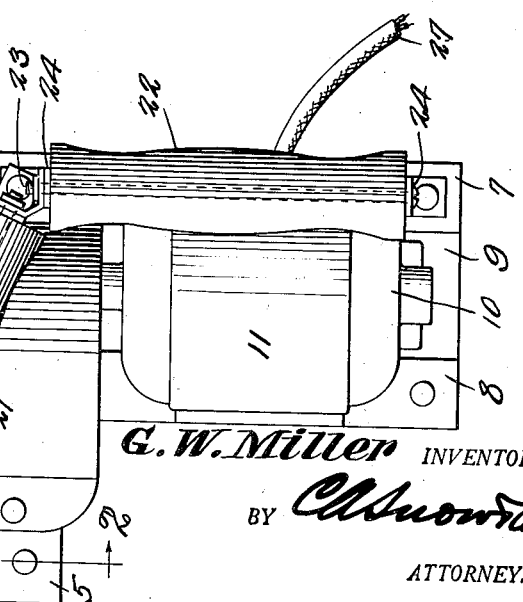
G. W. Miller INVENTOR.
BY *Ch Knowles*
ATTORNEYS.

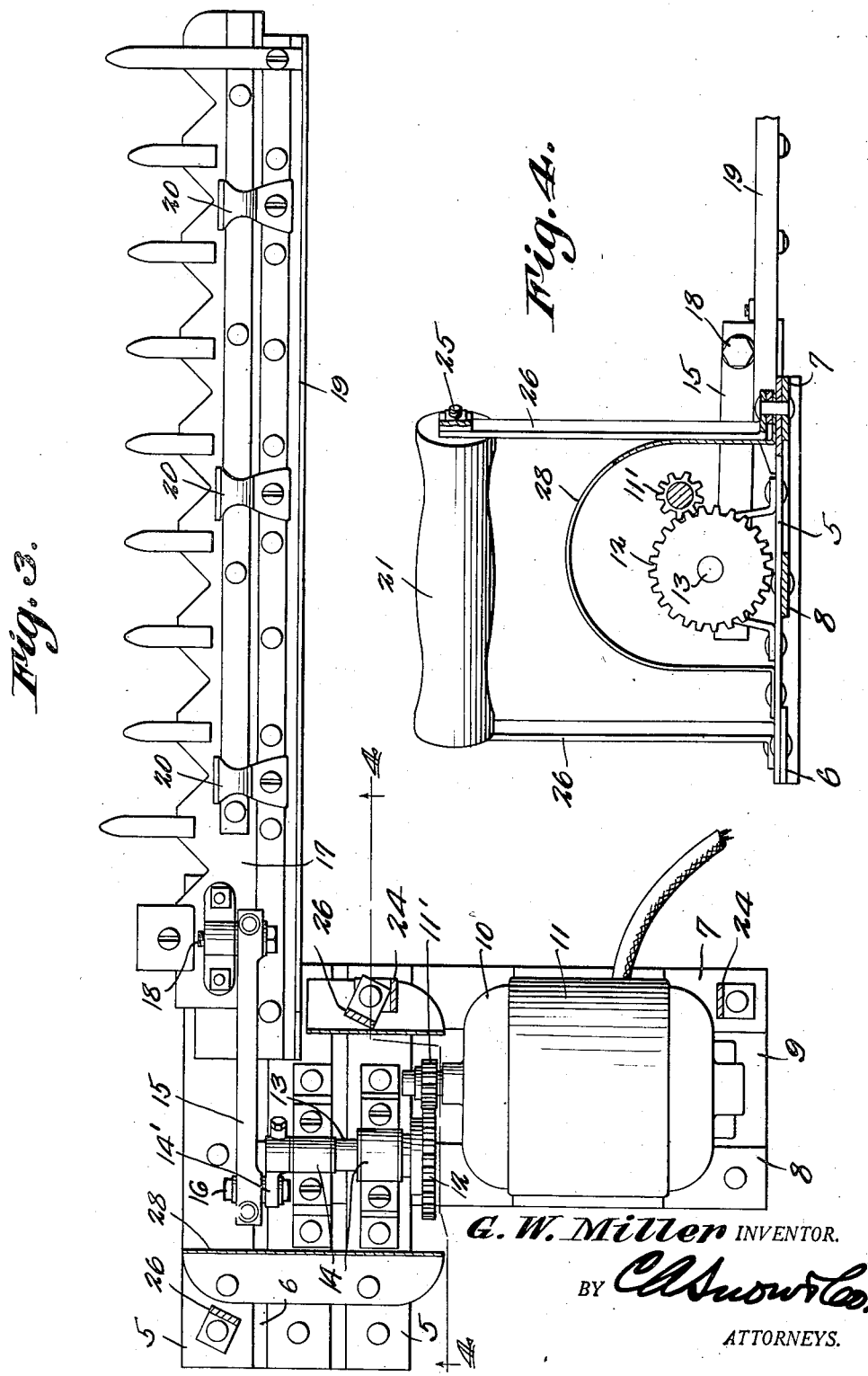

Patented May 27, 1941

2,243,641

UNITED STATES PATENT OFFICE 2,243,641

HEDGE TRIMMER

George W. Miller, Covington, Ohio

Application March 13, 1940, Serial No. 323,798

1 Claim. (Cl. 30—210)

This invention relates to hedge trimmers, the primary object of the invention being to provide a hedge trimmer of the motor-driven type, and constructed in such a manner that it may be conveniently held by the operator during the hedge trimming operation.

Another object of the invention is to provide a trimmer of this character which may be easily guided and moved along a hedge in such a way as to insure the true and even trimming of the hedge.

A further object of the invention is to provide a hedge trimmer embodying a reciprocating cutter bar operated at a rapid rate of speed to facilitate the trimming operation.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a plan view of a hedge trimmer constructed in accordance with the invention.

Figure 2 is a sectional view taken on line 2—2 of Figure 1 and illustrating the novel form of hand grip or supporting means.

Figure 3 is a plan view of the trimmer, the gearing guard being shown in section to illustrate the gearing.

Figure 4 is a sectional view taken on line 4—4 of Figure 3.

Referring to the drawings in detail, the device comprises a support embodying a plurality of bars 5 secured together and held in proper spaced relation with respect to each other, by means of the bars 6 and 7. The bar 8 also is connected to the bars 5. A bar 9 connects with the outer ends of the bars 7 and 8 and holds the bars 7 and 8 in spaced relation with respect to each other.

The bars 7 and 8 provide a support for the electric motor 10 which is held in position by means of the metal strap 11 that is shown as having its ends bolted to the bars 7 and 8. The shaft of the motor 10 is provided with a pinion 11' that meshes with the gear 12 mounted on one end of the shaft 13, the shaft 13 being mounted in bearings 14 that in turn are bolted to the support. A crank arm indicated at 14' is mounted on one end of the shaft 13, and is connected with one end of the pitman 15, by means of the crank pin 16. The opposite end of the pitman 15 is connected with the sickle bar 17, at 18. The sickle bar 17 moves over the bar 19, and is guided in its movements, by the guides 20.

An important feature of the invention, is in the construction and location of the hand grips 21 and 22, by means of which the trimmer is supported and held in balance at all times. Due to the angles at which the hand grips are supported, the operator may conveniently support the cutter to insure an even trimming of the hedge under treatment.

As shown, the hand grip 22 is mounted on the rod 23 that is supported at the upper ends of the bars 24 that rise from the bar 7. The hand grip 21 which is supported at an oblique angle with respect to the hand grip 22, is mounted on the rod 25 secured to the upper ends of the bars 26 that rise from the support.

The reference character 27 designates wires that connect with the motor, and supply electric energy from a suitable source not shown.

A guard indicated at 28 is mounted on the support and is curved to overlie the gears and protect the operator against injury, when the gears are in motion.

In view of the foregoing disclosure, it will be seen that the cutter may be easily balanced by the operator, and held in proper cutting position to insure an even trimming of the hedge.

What is claimed is:

A hedge trimmer comprising a support, a reciprocating sickle bar mounted on the support, a motor mounted on the support and adapted to operate said sickle bar, a forward handle mounted on the support and extended at right angles to the sickle bar, a second handle mounted on the support and disposed at an oblique angle with respect to the first mentioned handle, said handles embodying spaced vertical bars and hand grips disposed between the spaced bars, and the second mentioned handle having one of its ends disposed adjacent to one end of the first mentioned handle, whereby the trimmer may be held in complete balance while in operation.

GEORGE W. MILLER.